United States Patent [19]
Bexton

[11] Patent Number: 5,571,303
[45] Date of Patent: Nov. 5, 1996

[54] SULFUR-BASED FERTILIZER AND PROCESS FOR PRODUCTION THEREOF

[75] Inventor: Stewart G. Bexton, Calgary, Canada

[73] Assignee: Cominco Fertilizers Ltd., Calgary, Canada

[21] Appl. No.: 398,532

[22] Filed: Mar. 6, 1995

[51] Int. Cl.$^6$ ...................................................... C05B 7/00
[52] U.S. Cl. ........................................ 71/34; 71/53; 71/63
[58] Field of Search ...................................... 71/34, 53, 63

[56] References Cited

U.S. PATENT DOCUMENTS

| | | | |
|---|---|---|---|
| 4,330,319 | 5/1982 | Bexton et al. | 71/28 |
| 4,589,904 | 5/1986 | Harrison et al. | 71/61 |
| 5,112,379 | 5/1992 | Young | 71/31 |
| 5,378,259 | 1/1995 | Bassetti et al. | 71/59 |
| 5,383,951 | 1/1995 | Cross et al. | 71/61 |

Primary Examiner—Michael Lewis
Assistant Examiner—Amy M. Harding
Attorney, Agent, or Firm—Fitzpatrick, Cella, Harper & Scinto

[57] ABSTRACT

A particulate sulfur-based fertilizer comprising a uniform dispersion of sulfur and at least one member selected from the group consisting of ammonium sulfate, ammonium phosphate and mixtures thereof, the sulfur having an average particle size of less than about 100 μm. A process for producing a sulfur-based fertilizer is also described. The process comprises: (i) providing a first stream comprising ammonia; (ii) providing a second stream comprising a least one member selected from the group consisting of sulfuric acid, phosphoric acid and mixtures thereof; (iii) providing a third stream comprising an aqueous liquid; (iv) mixing the first stream, the second stream and the third stream to provide a liquid reaction mixture; (v) feeding the liquid reaction mixture to a mixer; (vi) feeding a fourth stream comprising molten sulfur to the mixer; (vii) maintaining a pressure drop across the mixer of at least about 200 kPa to form a homogenized melt of sulfur-based fertilizer; and (viii) solidifying the homogenized melt to produce the particulate sulfur-based fertilizer.

29 Claims, 1 Drawing Sheet

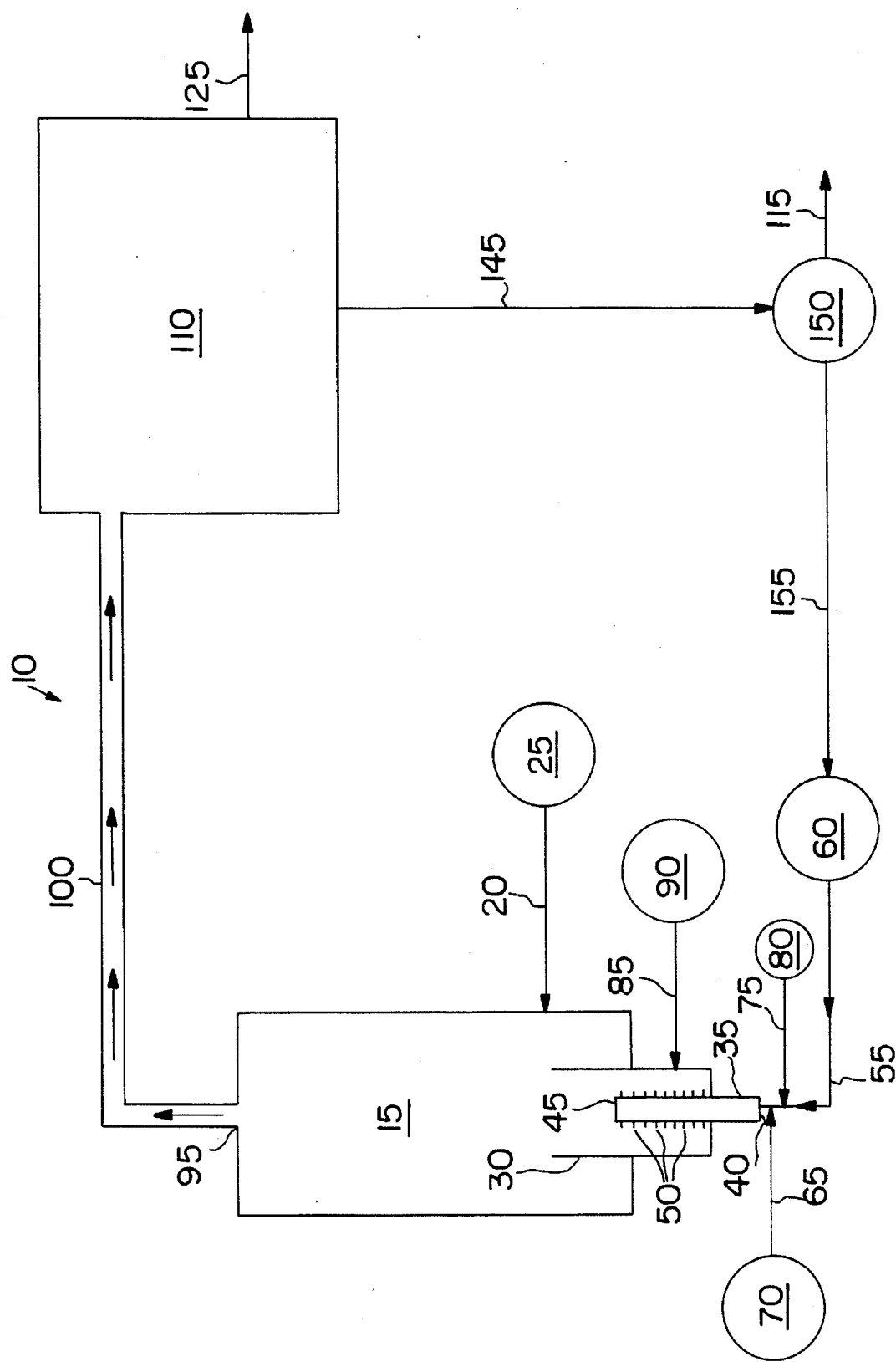

SULFUR-BASED FERTILIZER AND PROCESS FOR PRODUCTION THEREOF

BACKGROUND OF THE INVENTION

1. Field of the Invention

The present invention relates to a sulfur-based fertilizer and to a process for production thereof.

2. Description of the Prior Art

Sulfur and sulfur-based fertilizers are generally known. Indeed, sulfur is a very important element in the production of crops. Although it has been classified as a secondary element, many researchers are of the view that the importance of sulfur to crop growth and development parallels that of nitrogen, phosphorus and potash. As is known in the art, sulfur acts in a soil system by being oxidized to sulfate which may then be taken up by plants in the soil system.

There are many soil areas in North America where sulfur is inherently low and thus, crop production in these areas is limited. Further, the ever increasing application of other nutrients and fertilizers, together with general soil depletion, has led to increasing occurrence of sulfur-depleted soils. Generally, in order to attain efficient release of sulfur and improve plant growth in a given soil system, it is desirable to present the sulfur in conjunction with controlled amounts of other elements/nutrients such as nitrogen, phosphorus and the like. For example, in order to attain efficient release of nitrogen, phosphorus and sulfur to plants, a ratio of 10:2:1 is generally desirable. Thus, it is desirable to develop fertilizers which contain two or more elements/nutrients in a fixed amount.

Heretofore, the art has endeavoured to address the challenge of incorporating two or more elements/nutrients in a single fertilizer.

For example, U.S. Pat. No. 4,330,319 (Bexton et al.), the contents of which are hereby incorporated by reference, teaches a urea-sulfur fertilizer and a process for production thereof. Specifically, there is taught a homogeneous, solid, particulate urea sulfur fertilizer comprising a uniform dispersion of finely divided particles of sulfur in a urea matrix, the sulfur particle size being less than about 100 µm. The fertilizer is produced by contacting a molten stream of urea with a molten stream of sulfur, passing the combined streams through a mixing device across which is provided a pressure drop of at least about 200 kPa to form a homogenized melt finely divided sulfur dispersed in urea and solidifying the homogenized melt to obtain the urea-sulfur fertilizer. The Examples in Bexton et al. show production of urea-sulfur fertilizers have the following grades: 43.6:0:0:6.3 and 41.6:0:0:10.5. Bexton et al. teaches a process which clearly requires contacting a molten stream of urea with a molten stream of sulfur, namely molten streams of the reactants which directly form the urea-sulfur fertilizer. Further, the fertilizer taught by Bexton et al. necessitates the presence of a significant amount of nitrogen.

It would be desirable to incorporate sulfate, for example in the form of ammonium sulfate, in a sulfur-based fertilizer since this would present to the soil system both a short term sulfur dose (i.e. in the form of sulfate) and a long term sulfur dose (i.e. in the form element sulfur which is eventually oxidized to sulfate). Unfortunately, the process described by Bexton et al. is not applicable to incorporation of a sulfate such as ammonium sulfate since, once produced, the sulfate can not be presented in a molten form.

It would also be desirable to incorporate phosphate, for example in the form of ammonium phosphate, in a sulfur-based fertilizer. The main advantage of such a fertilizer would be to combine in a single fertilizer two elements/nutrients normally required for enhanced plant growth. Again, the process described by Bexton et al. is not applicable to incorporation of a phosphate such as ammonium phosphate since, once produced, ammonium phosphate can not be presented in a molten form.

It would be desirable to have a sulfur-based fertilizer which incorporates sulphate and/or phosphate. It would be further desirable if the production of such a fertilizer could be readily incorporated into an existing production process for ammonium sulphate and/or ammonium phosphate. It would be further desirable if the production of such a fertilizer could be readily incorporated into existing solidification units (e.g. granulation drums, prilling towers and the like).

SUMMARY OF THE INVENTION

It is an object of the present invention to provide a novel sulfur-based fertilizer which obviates or mitigates at least one of the above-mentioned disadvantages of the prior art.

It is another object of the present invention to provide a novel process for producing a sulfur-based fertilizer.

Accordingly, in one of its aspects, the present invention provides a particulate sulfur-based fertilizer comprising a uniform dispersion of sulfur and at least one member selected from the group consisting of ammonium sulfate, ammonium phosphate and mixtures thereof, the sulfur having an average particle size of less than about 100 µm.

Thus, when the present sulfur-based fertilizer is broken down (e.g. by application to soil, immersion in water, etc.), the sulfur portion of the fertilizer will have an average particle size of less than about 100 µm. It will be understood by those of skill in the art that the size of each particle of sulfur-based fertilizer is not particularly restricted.

In another of its aspects, the present invention provides a process for producing a particulate sulfur-based fertilizer comprising the steps of:

(i) providing a first stream comprising ammonia;

(ii) providing a second stream comprising a least one member selected from the group consisting of sulfuric acid, phosphoric acid and mixtures thereof;

(iii) providing a third stream comprising an aqueous liquid;

(iv) mixing the first stream, the second stream and the third stream to provide a liquid reaction mixture;

(v) feeding the liquid reaction mixture to a mixer;

(vi) feeding a fourth stream comprising molten sulfur to the mixer;

(vii) maintaining a pressure drop across the mixer of at least about 200 kPa to form a homogenized melt of sulfur-based fertilizer; and (viii) solidifying the homogenized melt to produce the particulate sulfur-based fertilizer.

Thus, it has been discovered that a sulfur-based fertilizer which incorporates sulphate and/or phosphate can be produced if elemental sulfur, in molten form, is incorporated into the reaction to produce ammonium sulfate and/or ammonium phosphate. In other words, it has been discovered that such a sulfur-based fertilizer can be produced if the reactants in the ammonium sulfate and/or ammonium phosphate processes are contacted with elemental sulfur prior to solidification of the ammonium sulfate and/or ammonium phosphate. Specifically, as discussed above, once the ammonium sulfate and/or ammonium phosphate have been solidified it is not possible to incorporate molten sulfur therewith in a uniform and homogeneous manner. The principal reason for this is that ammonium sulfate and ammonium phosphate will substantially decompose on melting.

As used herein, the term "sulfur-based fertilizer" is intended to mean a fertilizer which contains elemental sulfur. In the context of the present invention, the sulfur-based fertilizer also contains at least one member selected from the group consisting of ammonium sulfate, ammonium phosphate and mixtures thereof. Further, as used herein, the term ammonium phosphate is intended to have a broad meaning and includes one or more of the following: $NH_4H_2PO_4$, $(NH_4)_2HPO_4$ and $(NH_4)_3PO_4$. Still further, as used herein, the term ammonium sulphate is intended to have a broad meaning and includes one or more of the following $(NH_4)_2SO_4$ and $NH_4HSO_4$, the former being the predominant form used in the fertilizer industry.

The present sulfur based fertilizer may further comprise at least one trace element selected from the group consisting of zinc, magnesium, manganese, iron, copper, calcium and mixtures thereof, wherein the aggregate amount of trace element is less than about 5% by weight of the fertilizer. The source of these trace elements or micronutrients is not particularly restricted. Preferably, the trace elements are comprised in a waste effluent from an industrial process. More preferably the trace elements also act as a granulation agent for the sulfur-based fertilizer. Most preferably, the trace elements are present as a granulation agent in the form of a stripped zinc electrolyte. If a stripped zinc electrolyte is used as a granulation agent (discussed in more detail hereinbelow) to produce the present sulfur-based fertilizer, it is preferred that the sulfur-based fertilizer further comprises up to about 1.5%, more preferably from about 0.4% to about 1.3%, by weight zinc, from about 0.01% to about 0.2%, more preferably from about 0.07% to about 0.16%, by weight magnesium and from about 0.01% to about 0.1%, preferably from about 0.04% to about 0.09%, by weight manganese.

BRIEF DESCRIPTION OF THE DRAWING

Embodiments of the present invention will be described with reference to the accompanying drawing of FIGURE in which there is illustrated a schematic of plant and process for production of a sulfur-based fertilizer in accordance with an embodiment of the present invention.

DETAILED DESCRIPTION OF THE PREFERRED EMBODIMENTS

With reference to the FIGURE, there is illustrated a plant 10 for production of a sulfur-based fertilizer.

Plant 10 comprises a mixer 15. A feed line 20 is connected at one end to mixer 15 and at the other end to a molten sulfur holding tank 25. The nature of holding tank 25 is not particularly restricted nor is the method of providing the molten sulfur, both of which are within the purview of a person skilled in the art. See, for example U.S. Pat. No. 4,286,966 (Kirby et al.), the contents of which are hereby incorporated by reference. Preferably, line 20 and holding tank 25 are designed and operated to maintain the molten sulfur at a temperature in the range of from about 120° to about 150° C., more preferably from about 135° to about 145° C.

The precise nature of mixer 15 is not particularly restricted and is preferably one which will be able to provide particle sizes of discrete sulfur in the sulfur-based fertilizer having an average particle size of less than about 100 μm. The mixing device should be capable of effecting a pressure drop across itself of at least about 200 kPa, preferably at least about 350 kPa, more preferably at least about 500 kPa and may be as high as 1500 kPa or more. Persons skilled in the art will be able to reconcile the degree of pressure drop effected by a particular mixer (the higher the pressure drop, the higher the degree of homogenization obtained) with the energy required to operated the mixer in such a manner (more energy is required to attain a higher pressure drop which increases the overall cost of the process). See, for example, U.S. Pat. No. 4,330,319 (Bexton et al.), the contents of which are hereby incorporated by reference. The mixing device may be a homogenizer or a static mixer. Examples of suitable mixing devices include a Blendrix™ Motionless Mixer or a Ross™ Motionless Mixer.

The inlet of mixer 15 is adapted to include a premixer 30 which is equipped with a quill 35. Quill 35 is a tubular pipe have an inlet 40 and an outlet 45. The portion of quill 35 disposed in premixer 30 comprises a plurality of jets 50. It will be appreciated by those of skill in the art that a series of perforations (not shown) can be used in place of jets 50.

A line 55 is connected at one end to inlet 40 of quill 35 and at the other end to a scrubber liquor holding tank 60. The nature of the scrubber liquor housed in holding tank 60 will be described hereinbelow.

A line 65 is connected at one end to line 55 and at the other end to an ammonia holding tank 70 or any other suitable source of ammonia (not shown). A line 75 is connected at one end to line 55 and at the other end to a granulation agent holding tank 80. The granulation agent housed in holding tank 80 is not particularly restricted. The incorporation of a granulation agent generally is known in the art. See, for example Australian patent 492,758 (Golding), the contents of which are hereby incorporated by reference.

Preferably, the granulation agent is selected from the group consisting of zinc sulphate, ammonium phosphate, aluminum sulfate and mixtures thereof. A particularly preferred form of granulation agent is a stripped zinc electrolyte as described in U.S. Pat. No. 5,383,951 (Cross et al.), the contents of which are hereby incorporated by reference. A preferred stripped zinc electrolyte comprises from about 10 to about 30 g/L zinc, up to about 10 g/L magnesium, up to about 10 g/L and up to about 250 g/L sulfuric acid. A more preferred stripped zinc electrolyte comprises from about 20 to about 25 g/L zinc, from about 2 to about 4 g/L magnesium, from 1 about to about 2 10 g/L manganese and from about 190 to about 200 g/L sulfuric acid.

A line 85 is connected at one end to premixer 30 and at the other end to an acid holding tank 90. If a sulfur-ammonium sulfate fertilizer is to be produced, acid holding tank 90 contains sulfuric acid. If a sulfur-ammonium phosphate fertilizer is to be produced, acid holding tank 90 contains phosphoric acid.

Mixer 15 is provided with an outlet 95 to which is connected a thermostatically heated line 100. Line 100 is connected to a granulation unit 110. Granulation unit 110 is not particularly restricted and suitable units are known in the art. See, for example, U.S. Pat. No. 4,234,318 (Higgins et al.), the contents of which are hereby incorporated by reference.

From granulation unit 110 a stream comprising on-specification product exits via a line 125 and is fed to dryer, screening and packaging units (not shown). Another stream comprising under-sized, off-specification product, also known as "fines" together with air used in granulation unit 110, exits granulation unit 110 via a line 145 and is fed to a scrubber unit 150. Aqueous scrubber liquor formed in scrubber unit 150 is fed to scrubber liquor holding tank 60 via a line 155. Cleaned air emanates from scrubber unit 150 via line 115 and is further treated and/or vented to the atmosphere.

The present sulfur-based fertilizer may be produced in the following manner. A suitable valve (not shown) in line 55 adjacent holding tank 60 is opened and aqueous scrubber liquor begins to flow in line 55. Suitable valves (not shown) in lines 65 and 75, respectively, are opened to permit a flow of ammonia and granulation agent, respectively. Preferably, flow in lines 55 and 65 is pressurized, more preferably in the range of from about 200 to about 300 psi (about 1380 to about 2070 kPa), most preferably in the range of from about 250 to about 300 psi (about 1725 to about 2070 kPa).

Concurrently, a valve (not shown) in line 85 is opened to permit a flow of acid (sulfuric acid or phosphoric acid) to premixer 30. Preferably, the flow in line 85 is pressurized, more preferably in the range of from about 200 to about 300 psi (about 1380 to about 2070 kPa), most preferably in the range of from about 250 to about 300 psi (about 1725 to about 2070 kPa).

Thus, the contents of line 55 at inlet 40 of quill 35 comprise ammonia, scrubber liquor and granulation agent. The aqueous liquid is then fed to quill 35 where it exits therefrom via jets 50 into the mass of acid present in premixer 30 to form an exothermic reaction mixture.

The exothermic reaction mixture is then fed from premixer 30 to mixer 15. Concurrently, a valve (not shown) in line 20 is opened to permit a flow of molten sulfur to enter mixer 15. Preferably, the flow in line 20 is pressurized, more preferably in the range of from about 200 to about 300 psi (about 1380 to about 2070 kPa), most preferably in the range of from about 250 to about 300 psi (about 1725 to about 2070 kPa). The exothermic reaction mixture and molten sulfur stream are homogenized in mixer 15 to produce a multi-component slurry. As discussed above, mixer 15 is conventional and the operation thereof to provide a pressure drop of at least about 200 kPa is within the purview of a person skilled in the art.

The multi-component slurry exits mixer 15 via outlet 95 and enters line 100. As discussed above a pressure drop is created across mixer 15. Preferably, this results in the pressure of the multi-component slurry exiting mixer 15 being in the range of from about 10 to about 50 psi (about 70 to about 350 kPa), more preferably from about 10 to about 30 psi (about 70 to about 210 kPa).

Preferably, line 100 is maintained at a temperature of at least about 120° C., more preferably in the range of from about 120° to about 150° C., most preferably in the range of from about 135° to about 145° C. This may be accomplished by maintaining a back-pressure in the sprayer (not shown) in granulation unit 110 sufficient to avoid steam flash of the multi-component slurry resulting in cooling thereof.

Preferably, within about 10 seconds of exiting mixer 15, the multi-component slurry enters granulation unit 110 wherein it is solidified and granulated. As discussed hereinabove, granulation unit 110 is conventional and the operation thereof to produce a granulated product is within the purview of a person skill in the art.

As discussed above, on-specification product is removed from the effluent of granulation unit 110 by any conventional technique such as screening and, thereafter, is conveyed drying, screening and packaging units (not shown). The air from granulation unit 110 contains fine dust particles and this stream is passed through scrubber unit 150. Aqueous scrubber liquor formed in scrubber unit 150 is fed to scrubber liquor holding tank 60 via a line 155 and cleaned air emanates from scrubber unit 150 via line 115.

As is known in the art, the amounts of ammonia, acid, sulfur and aqueous stream may be regulated according to the properties desired in the product. For example, the acid typically is used in an amount which regulates the rate of production of the sulfur-based fertilizer. The amount of ammonia used is approximately stoichiometric to provide a sulfur-based fertilizer having a pH of from about 4 to about 7.5. The aqueous stream (e.g. scrubber liquor) is used in an amount to ensure satisfactory solidification of the homogenized melt. The molten sulfur is used in amount which will result in the desired sulfur level in the fertilizer product.

While the present invention has been described in detail with reference to a single illustrated embodiment, it will of course be readily understood that a number of modifications to the illustrated embodiment will be apparent to those of skill in the art.

For example, granulation unit 110 may be modified or substituted with a different solidification unit. Another preferred solidification unit is a prilling tower, for example, such as those disclosed in U.S. Pat. Nos. 4,153,431 (Higgins) and 4,389,356 (Higgins), the contents of each of which are hereby incorporated by reference. Other preferred solidification units include an inclined rotating pan and a fluidized bed.

Another modification contemplated herein is elimination from the illustrated embodiment of the need for a granulation agent. As is known in the art, granulation agents are desirable specifically for in ammonium sulfate production since, in granulation processes, this compound adheres to itself relatively poorly. In the present process, while use of a granulation agent is preferred is believed to be not required since the molten sulfur added during the present process will serve to promote the needed adhesion.

Yet another modification contemplated herein is modification of the illustrated embodiment to utilize the granulation agent at any point in the process up to the solidification unit. In other words, it is contemplated that the granulation agent can be injected, for example, adjacent granulation unit 110 after mixer 15.

Yet another modification contemplated herein is elimination from the illustrated embodiment of the need for a scrubber liquor. Specifically, the use of a scrubber liquor is a convenient way to introduce water into the reaction system. As is known in the art, water is needed to facilitate mixing of the reactants, and handling and granulation of the reaction product. In the present process, it is convenient, and thus preferred, to use scrubber liquor as the water source since scrubbing and production of scrubber liquor is conventional in the art. However, it should be clearly recognized that the source of water can be other than scrubber liquor. For example, the source of water could be a dilute stream of acid. Alternatively, the source of water could be the stripped zinc electrolyte, if used. Of course, persons skilled in the art will recognize that the source of water can be spread over two or more reactant streams to the process (e.g. portion in the form of relatively dilute acid and portion in the form of stripped zinc electrolyte).

Yet another modification contemplated herein is modification in the illustrated embodiment of the combination of mixer 15 and premixer 30. Specifically, it is contemplated that these elements need not be integral and can be remote from one another.

Further modifications will be apparent to those of skill in the art with this specification in hand, which modifications do not depart from the spirit of the present invention.

What is claimed is:

1. A homogeneous granulated sulfur-containing fertilizer, each granule of the fertilizer comprising:
   a uniform dispersion of: (i) sulfur particles, and (ii) at least one member selected from the group consisting of ammonium sulfate, ammonium phosphate and mixtures thereof;
   wherein the sulfur particles in the uniform dispersion have an average particle size of about 100 μm or less.

2. The fertilizer defined in claim 1, wherein the uniform dispersion comprises sulfur and ammonium sulfate.

3. The fertilizer defined in claim 1, wherein the uniform dispersion comprises sulfur and ammonium phosphate.

4. The fertilizer defined in claim 1, further comprising at least one trace element selected from the group consisting of zinc, magnesium, manganese, iron, copper, calcium and mixtures thereof, wherein the aggregate amount of trace element is less than about 5% by weight of the fertilizer.

5. The fertilizer defined in claim 1, further comprising up to about 1.5% by weight zinc, from about 0.01% to about 0.2% by weight magnesium and from about 0.01% to about 0.1% by weight manganese.

6. The fertilizer defined in claim 1, further comprising from about 0.4% to about 1.3% by weight zinc, from about 0.07% to about 0.16% by weight magnesium and from about 0.04% to about 0.09% by weight manganese.

7. A process for producing a homogeneous granulated sulfur-containing fertilizer comprising the steps of:
   (i) providing a first stream comprising ammonia;
   (ii) providing a second stream comprising at least one member selected from the group consisting of sulfuric acid, phosphoric acid and mixtures thereof;
   (iii) providing a third stream comprising an aqueous liquid;
   (iv) mixing and reacting the first stream, the second stream and the third stream to form an exothermic liquid reaction mixture;
   (v) feeding the liquid reaction mixture to a mixer;
   (vi) feeding a fourth stream comprising molten sulfur to the mixer, and mixing the molten sulfur with the liquid reaction mixture prior to solidification of the liquid reaction mixture;
   (vii) maintaining a pressure drop across the mixer of at least about 200 kPa to form a homogenized melt of sulfur-containing fertilizer; and
   (viii) solidifying the homogenized melt to produce the granulated sulfur-containing fertilizer.

8. The process defined in claim 7, wherein Step (viii) comprises feed the homogenized melt to a solidification unit.

9. The process defined in claim 8, wherein Step (viii) further comprises scrubbing dust laden air from the solidification unit to produce a scrubber liquor.

10. The process defined in claim 9, wherein the third stream comprises the scrubber liquor.

11. The process defined in claim 7, wherein the solidification unit is a granulation unit.

12. The process defined in claim 7, wherein the homogenized melt is maintained at a temperature of at least about 120° C. up to the point at which it enters the solidification unit.

13. The process defined in claim 7, wherein the solidification unit is a prilling tower.

14. The process defined in claim 7, wherein the solidification unit is an inclined rotating pan.

15. The process defined in claim 7, wherein the solidification unit is a fluidized bed.

16. The process defined in claim 7, wherein Step (iv) comprises initially mixing the first stream and the third stream and thereafter adding the second stream.

17. The process defined in claim 7, wherein prior to Step (iv), a granulation agent is added to at least one of the first stream, the second stream and the third stream.

18. The process defined in claim 17, wherein the granulation agent is selected from the group consisting of zinc sulphate, ammonium phosphate, aluminum sulfate and mixtures thereof.

19. The process defined in claim 17, wherein the granulation agent is a stripped zinc electrolyte comprising from about 10 to about 30 g/L zinc, up to about 10 g/L magnesium, up to about 10 g/L and up to about 250 g/L sulfuric acid.

20. The process defined in claim 17, wherein the granulation agent is a stripped zinc electrolyte comprising from about 20 to about 25 g/L zinc, from about 2 to about 4 g/L magnesium, from 1 about to about 2 10 g/L manganese and from about 190 to about 200 g/L sulfuric acid.

21. The process defined in claim 7, wherein prior to Step (iv), a granulation agent is added to the first stream, the granulation agent being selected from the group consisting of zinc sulphate, ammonium phosphate, aluminum sulfate and mixtures thereof.

22. The process defined in claim 7, wherein prior to Step (iv), a granulation agent is added to the third stream, the granulation agent being selected from the group consisting of zinc sulphate, ammonium phosphate, aluminum sulfate and mixtures thereof.

23. The process defined in claim 7, wherein Step (iv) is conducted in a premixer and, in accordance with Step (v), the resulting liquid reaction mixture is fed to the mixer.

24. The process defined in claim 23, wherein the mixer is a pipe reactor equipped with an inlet for molten sulfur.

25. The process defined in claim 7, wherein Step (vii) comprises maintaining a pressure drop across the mixer of at least about 350 kPa.

26. The process defined in claim 7, wherein Step (vii) comprises maintaining a pressure drop across the mixer of at least about 500 kPa.

27. The process defined in claim 7, wherein the fourth stream is maintained at a temperature of from about 120° to about 150° C.

28. The process defined in claim 7, wherein the fourth stream is maintained at a temperature of from about 135° to about 145° C.

29. The process defined in claim 7, wherein for production of a sample of the sulfur-based fertilizer, the period between Step (vii) and Step (viii) is less than about 10 seconds.

* * * * *

REEXAMINATION CERTIFICATE (4178th)

United States Patent [19]
Bexton

[11] B1 5,571,303
[45] Certificate Issued Oct. 17, 2000

[54] SULFUR-BASED FERTILIZER AND PROCESS FOR PRODUCTION THEREOF

[75] Inventor: Stewart G. Bexton, Calgary, Canada

[73] Assignee: Cominco Ltd., Vancouver, Canada

Reexamination Request:
No. 90/005,389, Jun. 10, 1999

Reexamination Certificate for:
| | |
|---|---|
| Patent No.: | 5,571,303 |
| Issued: | Nov. 5, 1996 |
| Appl. No.: | 08/398,532 |
| Filed: | Mar. 6, 1995 |

[51] Int. Cl.$^7$ ................ C05B 7/00; C05B 9/02
[52] U.S. Cl. ........................ 71/34; 71/53; 71/63
[58] Field of Search ........................ 71/34, 53, 63

[56] References Cited

U.S. PATENT DOCUMENTS

| | | | |
|---|---|---|---|
| 3,635,691 | 1/1972 | Earl | 71/59 |
| 3,785,796 | 1/1974 | Mann, Jr. | 71/28 |
| 4,142,885 | 3/1979 | Heumann et al. | 71/28 |
| 4,943,308 | 7/1990 | Vanmarcke et al. | 71/29 |
| 5,152,821 | 10/1992 | Walter | 71/33 |

OTHER PUBLICATIONS

Solterra Minerals Inc. brochure, Advanced Fertilizer and Industrial Minerals Technology (no date available).

*Primary Examiner*—Wayne A. Langel

[57] ABSTRACT

A particulate sulfur-based fertilizer comprising a uniform dispersion of sulfur and at least one member selected from the group consisting of ammonium sulfate, ammonium phosphate and mixtures thereof, the sulfur having an average particle size of less than about 100 μm. A process for producing a sulfur-based fertilizer is also described. The process comprises: (i) providing a first stream comprising ammonia; (ii) providing a second stream comprising a least one member selected from the group consisting of sulfuric acid, phosphoric acid and mixtures thereof; (iii) providing a third stream comprising an aqueous liquid; (iv) mixing the first stream, the second stream and the third stream to provide a liquid reaction mixture; (v) feeding the liquid reaction mixture to a mixer; (vi) feeding a fourth stream comprising molten sulfur to the mixer; (vii) maintaining pressure drop across the mixer of at least about 200 kPa to form a homogenized melt of sulfur-based fertilizer; and (viii) solidifying the homogenized melt to produce the particulate sulfur-based fertilizer.

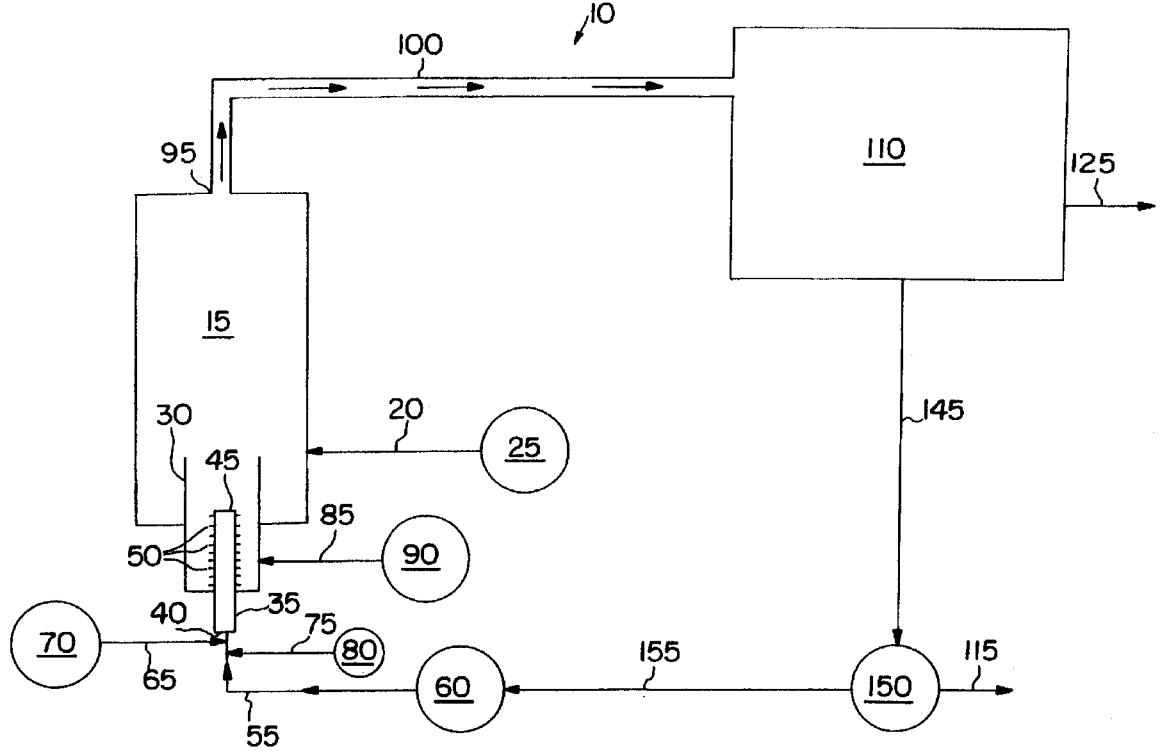

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–29 is confirmed.

New claims 30 and 31 are added and determined to be patentable.

*30. A sulfur-containing fertilizer, each granule of which comprises a homogeneous dispersion of: (i) sulfur particles, and (ii) at least one member selected from the group consisting of ammonium sulfate, ammonium phosphate and mixtures thereof;*

*wherein the granule will break down upon contact with water to yield sulfur particles having an average particle size of less than about 100 µm.*

*31. A sulfur-containing fertilizer, each granule of which consists essentially of a uniform dispersion of:*

*(i) discrete sulfur particles, and (ii) at least one member selected from the group consisting of ammonium sulfate, ammonium phosphate and mixtures thereof;*

*wherein the discrete sulfur particles in the uniform dispersion have an average particle size of less than about 100 µm.*

\* \* \* \* \*